United States Patent Office 3,832,159
Patented Aug. 27, 1974

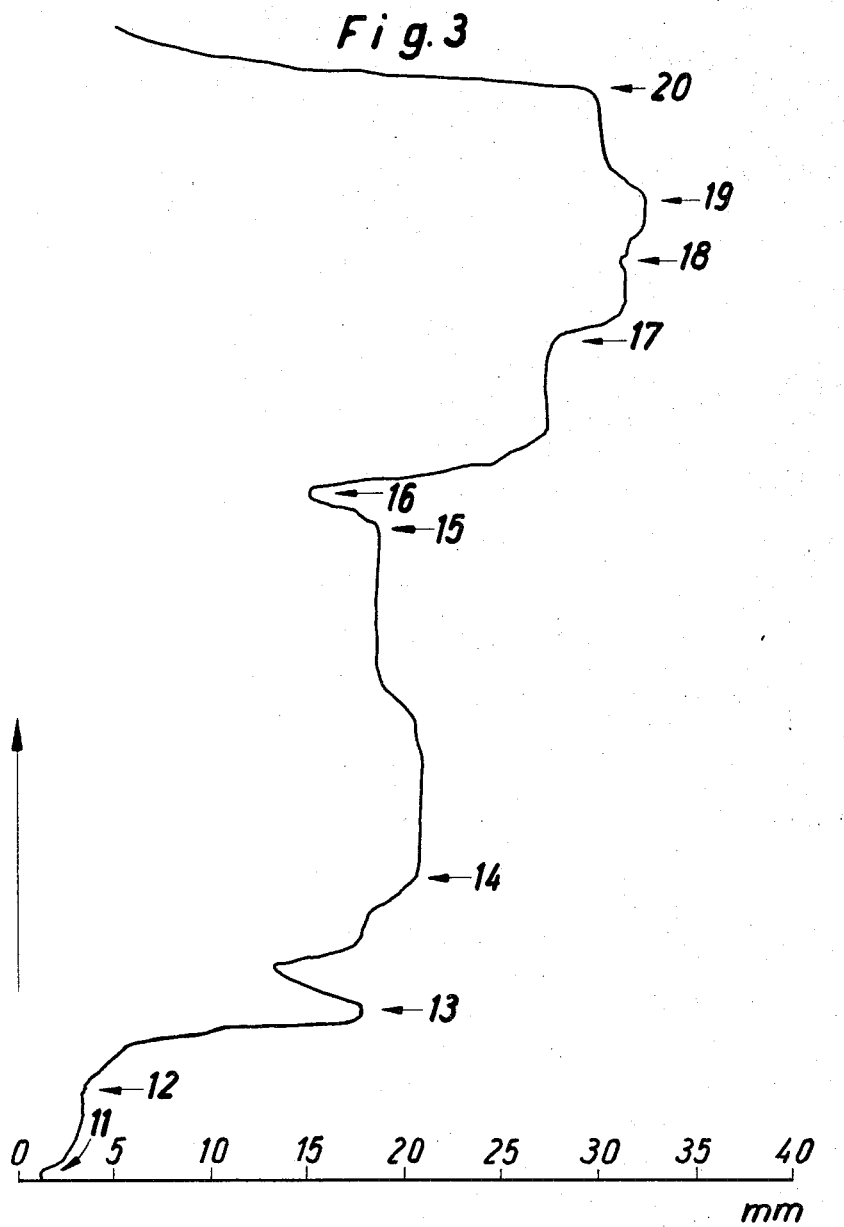

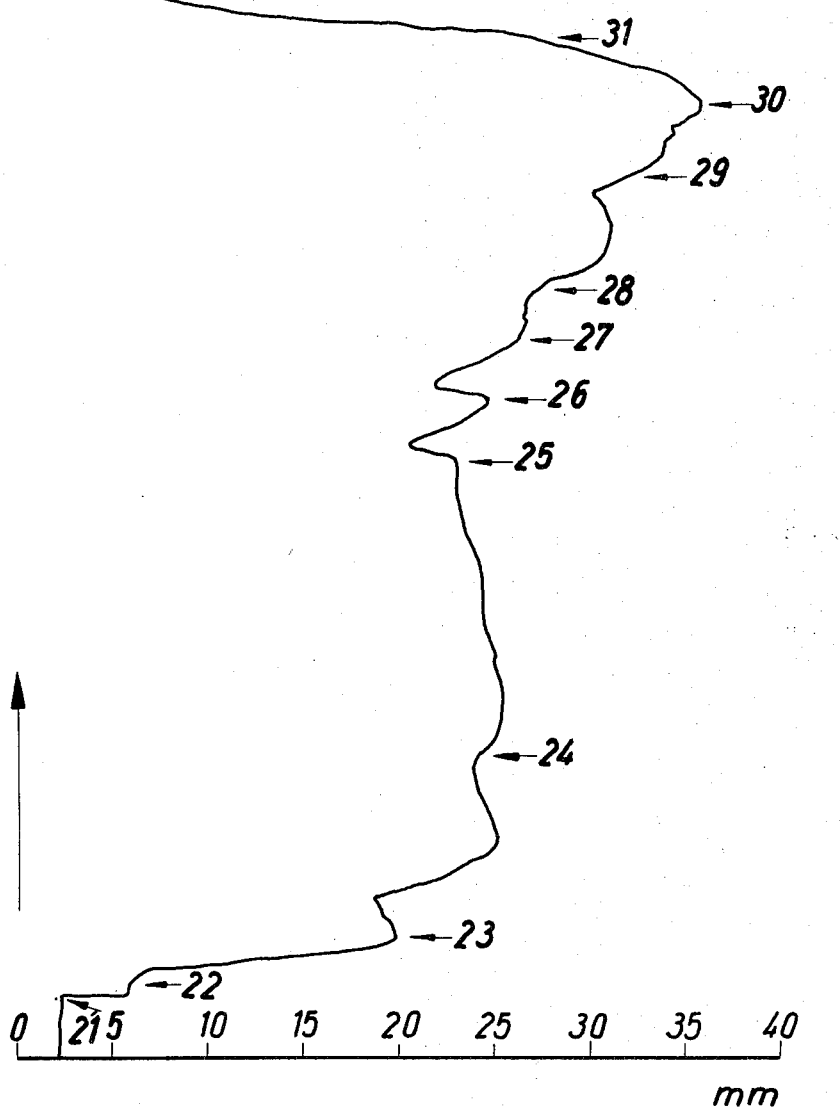

3,832,159
PROCESS FOR MONITORING AND CONTROLLING THE SEQUENCE OF REACTIONS IN A BASIC OXYGEN STEEL PRODUCTION PROCESS
Erich Höffken, Dinslaken, and Gerd Kreyss, Breitscheid, near Dusseldorf, Germany, assignors to August Thyssen-Hutte, Dusseldorf, Germany
Filed Dec. 8, 1971, Ser. No. 206,087
Int. Cl. C21c 7/00; G01m 3/04
U.S. Cl. 75—60                        2 Claims

ABSTRACT OF THE DISCLOSURE

An oxygen blow lance for a metal refining process carries a lever pivotably attached to an outer tube of the lance and guidably attached for displacement along an inner tube of the lance, the lever undergoing pivotal movement in proportion to relative longitudinal displacement of the tubes during the refining process. The lever carries a plunger which cooperates with an induction coil fixed to the outer tube to produce an electrical signal indicative of the relative longitudinal displacement between the tubes. The electrical signal is fed to a recorder where the relative longitudinal displacement between the tubes is plotted as a function of time to produce a curve from which the sequence of reactions can be observed.

BACKGROUND OF THE INVENTION

(a) Field of the Invention

The present invention relates to a process for monitoring and controlling the sequence of reactions in a basic oxygen steel production process such as the LD process.

(b) Description of the Prior Art

In one of the known processes of this kind, the sound waves originating during the sequence of operations are measured and recorded and used for monitoring and controlling the refining process. However, sound waves are also recorded in this process which are generated outside the converter. In this manner, the recorded curve behavior is disrupted and it yields erroneous results.

A further disadvantage is that minute differences are not recognizable in the curve behavior, as the registering instrument of the measuring device records a significantly oscillating curve. The microphone cage, which must be located in the proximity of the outlet of the converter, is subjected to a considerable influence of heat at this location and is often damaged by the ejected slag.

In another known process, the intensity of the infrared radiation emitted from the converter flame during the refining process and having wavelengths longer than one micron is continuously recorded as a function of time and the thus recorded curve is observed and the decrease of its ordinates is used as an indication that foaming of the slag can be expected. Also in this process, the measuring device, in this case an optical instrument, must be located in the vicinity of the outlet of the converter. However, the objective lens of this instrument is very quickly soiled by the converter ejections or dust at this location, and this results in distortion of the recorded curve behavior and a faultless judgment is rendered impossible. In addition to the above, the converter flame is very often impure and has many streaks. Moreover, the development of the flame is influenced by the shape of the outlet (German published patent application 1,277,888).

In another known process, the electric conductivity between the electrically insulated blow lance and the molten metal bath, as well as the conductivity between a probe, centrally protruding from the blow lance into the free blow jet and electrically insulated from the blow lance, and the molten metal bath are determined, said conductivities being dependent on the sequence of reaction, and being used for the regulation of the sequence of reactions. This conventional process is disadvantageous in that the apparatus for the implementation of this process is very expensive and, moreover, it is very difficult to keep this apparatus safe during the operation, as all lance and probe devices must be supported so as to be electrically insulated (German published patent application 1,299,671, patent application laid open for public inspection No. 1,433,461).

A further known process is characterized in that the molten metal bath movements, which are transmitted to the refining container, are sensed by an oscillation sensor attached to the refining container; the oscillations are measured or recorded and used as measured or regulating values for the refining process.

The disadvantages of this process are that all oscillations emanating from sources outside the converter are also recorded and thusly distort the recorded curve. The recorded curve itself has a strongly oscillating characteristic, so that minute changes are not distinguishable (patent application laid open for public inspection No. 1,458,-882).

SUMMARY OF THE INVENTION

It is an object of the present invention to eliminate the deficiencies of the aforementioned conventional processes. Furthermore, the monitoring or controlling of the sequence of reactions is made more positively and more accurately, and the apparatus is simple and operational.

According to the invention, the relative longitudinal displacement between the inner and the outer tube of the oxygen blowing lance, which depends upon the sequence of the reactions, is continuously measured and recorded as a function of time. The recorded curve can be subsequently used as a measured or regulation value for the refining process.

An apparatus, which is particularly suitable for this process, is provided at the upper portion of the oxygen blow lance with an angular lever, which is rotatably attached to the outer tube, the longer arm of said lever engaging a guiding ring, which is fixedly attached to the inner tube, and wherein a plunger, movable in an induction relay, is attached to the shorter arm. The outer tube, can for instance, be made of steel, and the inner tube of the oxygen blow lance can be made of copper.

The invention will be explained in greater detail, reference being had to an embodiment of the invention.

BRIEF DESCRIPTION OF THE DRAWING

FIG. 3 is a diagrammatic illustration of a normal LD-melt recorded in accordance with the process according to the invention; and FIG. 4 is a diagrammatic illustration of an over-blown LD-melt, which has been recorded in accordance with the process according to the invention.

DETAILED DESCRIPTION

Figure 1:
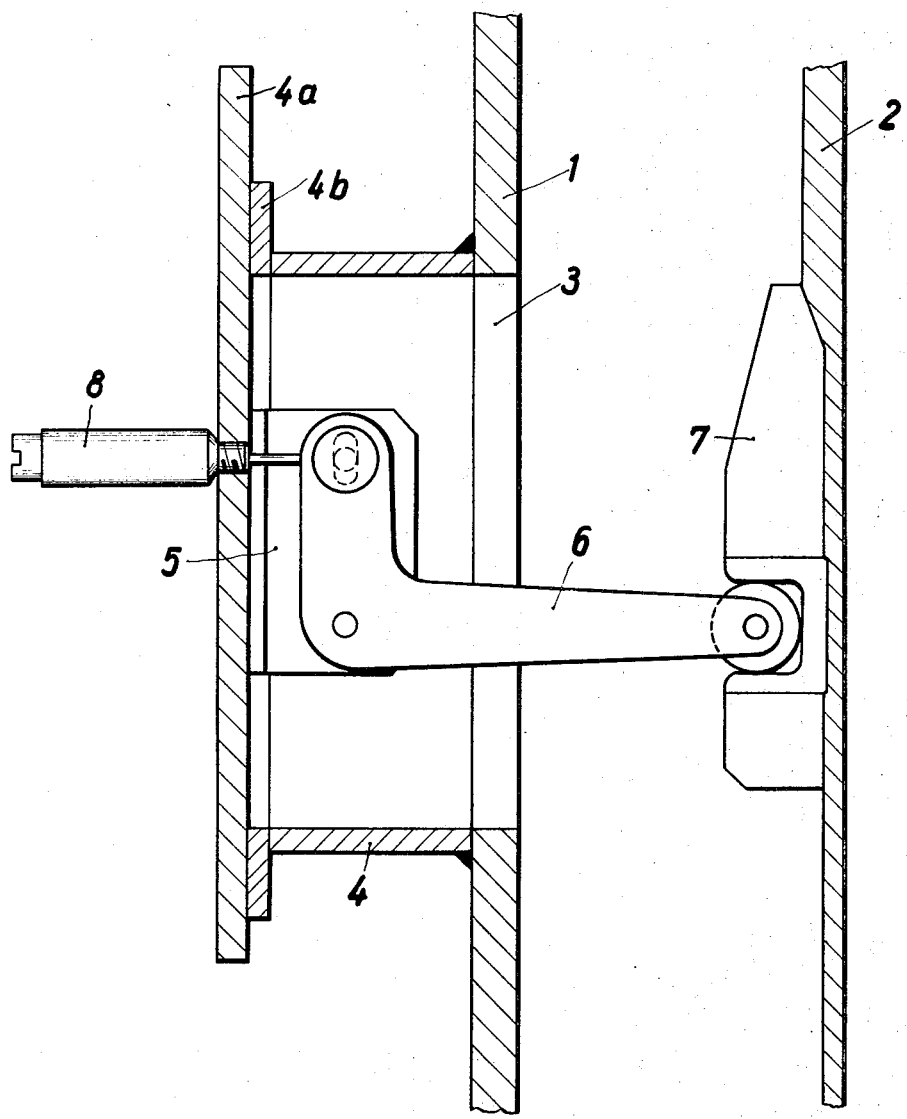
FIG. 1 is a partial cross-section of the upper portion of an oxygen blow lance with a measuring device according to the invention.

Referring to FIG. 1 there is seen the outer and inner tubes 1 and 2 respectively of the oxygen blow lance of a basic oxygen steel production furnace. The outer tube is made of steel and the inner tube is made of copper. The outer tube 1 is provided at the illustrated upper portion of the lance with an opening 3, to which a box 4 is outwardly welded, the box being sealed by a lid 4a with a sealing plate 4b. An angular lever 6 is rotatably supported in two cheeks 5 attached to the lid 4a. The longer arm of the angular lever 6 engages a guiding ring 7, which is fixedly attached to the inner copper tube 2. A plunger 8a is attached to the shorter arm of the angular lever 6 by means of an extension, and the plunger is movable inside an induction relay 8, which is attached to the lid 4a.

Figure 2:
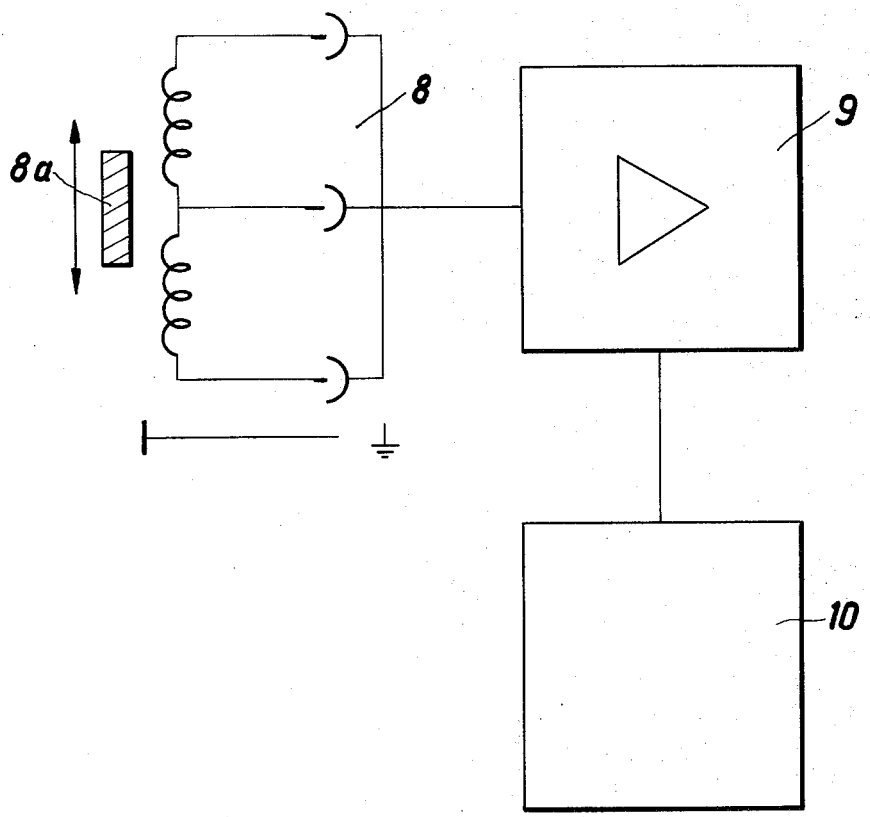
FIG. 2 is a schematic view of the measuring device.

The outer steel tube of the blow lance expands during the operation of the converter as a result of greater heating, i.e. more than the inner copper tube which is cooled by water. The resulting relative longitudinal displacement is transmitted by the angular lever 6 to the plunger 8a. The flux of the magnet in the inductive relay 8 is changed by the displacement of the plunger, and a voltage is induced in the coils. As the amplitude of the voltage is very small, the voltage signal is fed, as shown in FIG. 2, to an amplifier 9 with a carrier frequency of 5 kilohertz, and subsequently to a recording potentiometer. The recording instrument of the recording potentiometer traces a curve illustrating the relative displacement between the inner copper tube 2 and the outer steel tube 1 with respect to time from the commencement of blowing.

The largest relative longitudinal shift, for an oxygen blow lance of 25 m. as currently utilized, is approximately 36 to 42 mm. Up to now, 60 mm. were measured as the maximum. The permanent deformation of the lance is approximately 2.4 mm.

The curve recorded during a usual LD-melt will be discussed in the following, with reference to FIG. 3.

At the beginning 11 of the blowing operation, the lance has a permanent deformation of 2.4 mm. After the carbon has been ignited at 12, the lance deformation increases as a result of the temperature increase resulting therefrom. At 13, the first charge of lime occurs, which lowers the temperature in the converter; the decrease in the temperature is indicated by a short-lived decrease in the deformation of the lance. At 14, the normal height of the slag foam is achieved. The lance is lowered, as the converter would otherwise overfoam. Point 15 shows the second addition of lime, which again is associated with a temperature decrease of the melt, and which again results in a temporary return in the lance deformation. At point 16, the lance is slightly raised, in order to bring the second lime charge into the solution. Region 17 probably shows the end of the dissolving of the scrap metal. In the following step, the lance tube is lowered again at 18, in order to decrease the creation of the slag. Afterwards, the speed of blowing is additionally decreased at 19, in order to avoid overfoaming of the converter. Beyond the point 19, the expansion of the lance slowly decreases, which indicates termination of the creation of CO as a result of reduction of the amount of carbon in the molten metal bath. Point 20 indicates the end of blowing.

A curve of an overblown LD-melt is explained with reference to FIG. 4 therein 21 represents the beginning of blowing with a permanent deformation of the blow lance of approximately 2.4 mm. After the carbon has been ignited at 22, the lance expansion increases significantly, as a result of increase in the temperature, to point 23, which is the time of the first charge of lime, whereat a sharp break is seen in the curve as a result of the decrease in the temperature of the molten metal bath. At 24, the normal height of the slag foam is achieved. The lance is lowered in order to avoid overfoaming of the converter. At 25, the second lime charge is added, which is again indicated by a temporary shift of the curve toward the left. Differently from the aforementioned melt according to FIG. 3, a third and a fourth charge of lime are added at 26 and 27. Point 29 probably shows the end of the dissolution of the scrap metal. At point 29, the lance is lowered. At point 30 the production of CO decreases. The slag foam collapses, and, as a result thereof the lance expansion decreases (i.e. from point 30 to point 31). The end of the blowing is shown at 31.

The end of the blowing is located in the steeply decreasing branch of the lance expansion curve. This indicates, that the melt is very soft and already slightly overblown.

The description and comparison of both curves shows that the sequence of reactions in the converter can be monitored and controlled extremely well in accordance with the process according to the invention.

The process according to the invention is suitable not only for LD-melt processes, but can be used in all converters operating in accordance with blowing processes.

What is claimed is:

1. A process for monitoring a sequence of reactions in a basic oxygen steelmaking furnace in which oxygen is blown downwardly to a melt through a lance having an inner and an outer tube which tubes undergo relative longitudinal displacement as a result of differential expansion indicative of the thermal condition of the basic oxygen furnace, said process comprising continuously recording relative longitudinal displacements between the inner and the outer tubes of the lance with respect to time in the course of the refining process during oxygen blowing through the lance, for use for controlling the refining process.

2. A process as claimed in claim 1 wherein said recording comprises graphically plotting the relative displacement as a function of time.

References Cited

UNITED STATES PATENTS 3,708,159   2/1973   De Bray _____ 75—60

L. DEWAYNE RUTLEDGE, Primary Examiner

P. D. ROSENBERG, Assistant Examiner

U.S. Cl. X.R.

73—43